United States Patent Office 3,463,899
Patented Aug. 26, 1969

3,463,899
DEVICE FOR WELDING PARTS BY ELECTRON BOMBARDMENT
Henri Foulquier, La Celle-Saint-Cloud, René Roudier, Sucy-en-Brie, and Paul Thome, Saint-Cloud, France, assignors to Commissariat a l'Energie Atomique, Paris, France
Filed Apr. 6, 1967, Ser. No. 628,931
Claims priority, application France, Apr. 15, 1966, 57,795
Int. Cl. B23k *15/00, 7/04*
U.S. Cl. 219—121                                      3 Claims

ABSTRACT OF THE DISCLOSURE

A device is disclosed for welding a sleeve to a plate by the use of an electron beam device. The electron beam device is supported within the sleeve and adapted to weld an annular joint between the sleeve and plate. A vacuum enclosure is positioned over the weld joint and includes inflatable and cooled sealing means to provide leak-tightness of the enclosure irrespective of the shape of the sleeve and plate. The electron beam gun may also be driven by the use of a self-driven trolley arrangement mounted on rails positioned within the vacuum enclosure.

---

This invention relates to a process and device for welding by electron bombardment, in particular in the case in which the parts are too massive to be wholly contained within a vacuum enclosure.

Among the different processes which are commonly employed for the purpose of welding large parts are electric arc welding, resistance welding or spot welding, or gas welding. Although such processes prove satisfactory in the majority of applications, there nevertheless remain some cases in which the execution of a weld is governed by very rigorous conditions which can be satisfied only by having recourse to the process known as electron bombardment.

Operations involved in electron bombardment welding are performed in vacuo and accordingly make it possible to obtain welds which are free from contamination, which are particularly sound, and which exhibit outstanding weld penetration, depending on the controlled power of the electron beam (ratio of the power of the sighting beam to the cross-sectional area of the electron beam). For example, it is widely acknowledged that, using power outputs of the order of several kilowatts, a thickness of steel of nearly 50 millimeters can readily be welded in a single pass with a resulting weld fillet not exceeding 3 millimeters in width.

By reason of the concentration of energy which it is possible to obtain by means of this process, the amount of heat delivered per unit length of the weld fillet is maintained at a minimum value, with the result that deformations and shrinkages caused by welding are incomparably smaller than with conventional arc welding processes. Moreover, the shapes of the high-penetration weld fillets make it possible to dispense with any special machining of chamfered edges on parts to be welded, to reduce the number of welding passes required and consequently to reduce the number of inspections and successive cleaning operations which are necessary in the other processes.

However, the practical execution of the process under consideration is limited in practice by the fact that the parts and the electron gun must be placed in evacuated enclosures through which mechanical displacements, optical viewing and like operations must be performed, thereby entailing capital investment which is correspondingly higher as the parts to be welded are more massive.

The aim of the present invention is to circumvent the above-mentioned disadvantages by means of a rapid and simple operation which consists in producing a vacuum only within the particular portion of the parts to be joined in which a weld is to be made.

Accordingly, the invention is directed to a device which is characterized in that it comprises a vacuum enclosure of relatively small volume which is mounted on a portion of the parts to be welded around the joint to be formed, an electron gun which is also supported on the parts to be welded inside said enclosure and adapted to move freely with respect to said enclosure, and inflatable members for sealing the junction between said enclosure and the parts to be welded and closely conforming to the shape of the surfaces of said parts.

The device under consideration can thus be utilized without any special preparation on any parts which are to be welded, absolute leak-tightness of the enclosure being made possible by the inflatable seal which takes the exact shape of said parts. Moreover, the leak-tightness thus provided is in no way interrupted by penetrations for the electron gun control system since such penetrations are limited to the passage of supply cables and since, in addition, the motion of the electron gun is not associated with the enclosure.

However, the electron gun remains strictly centered by virtue of the fact that it is supported on the parts, thus readily ensuring that the electron beam is directed with a high degree of precision onto the joint to be welded, as is necessary in the electron bombardment process.

A device of this type can therefore make it possible to undertake under good conditions the welding of massive plates and parts for which other processes of the prior art are wholly unsuited by reason of the quantity of heat to be supplied to the parts, the shapes of chamfers of the weld fillets obtained, and the excessive deformations which arise after welding.

Further properties and advantages of the invention will become apparent both from the following description of embodiments which are given by way of example and from the accompanying drawings, in which.

Figure 1:
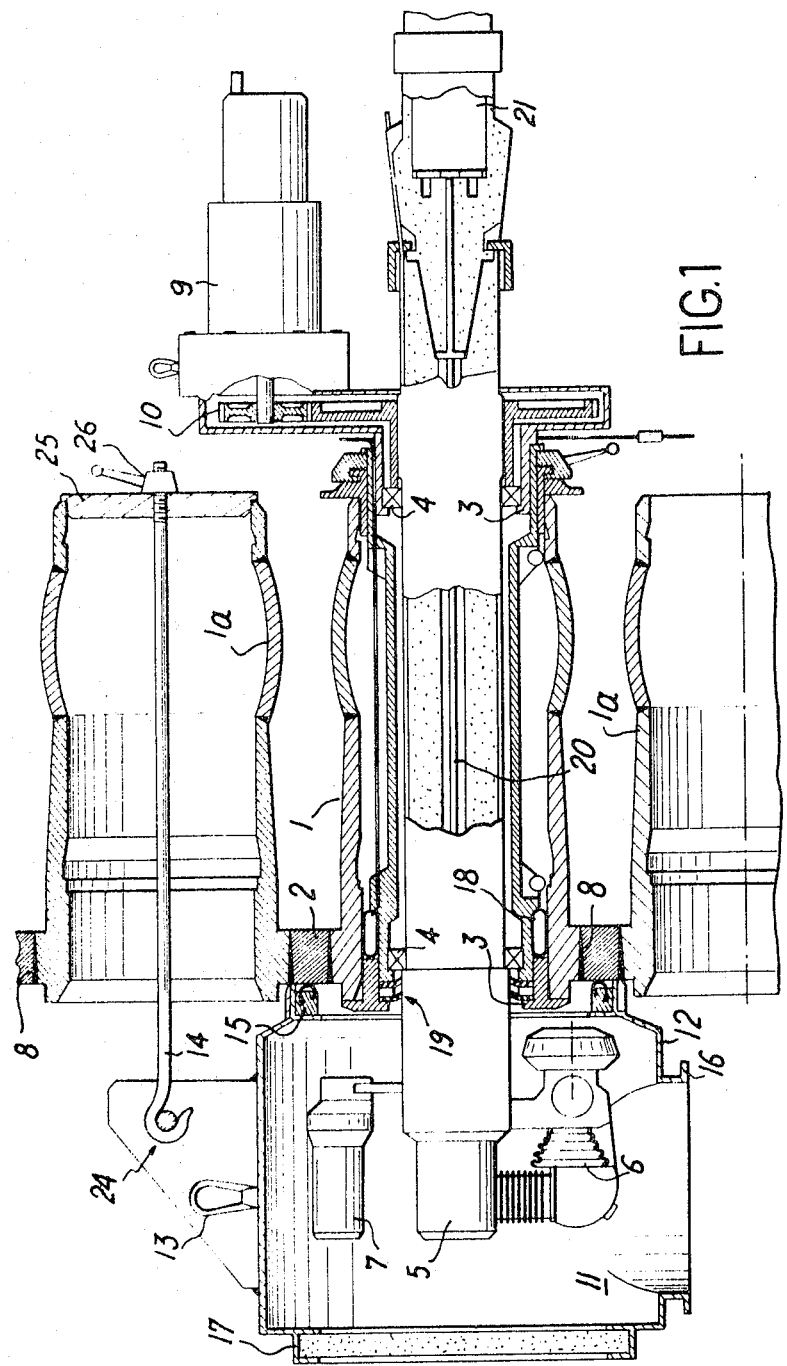
FIG. 1 is a longitudinal sectional view of the welding device according to a first form of construction.

The example of construction which is illustrated in FIGURE 1 relates to the welding of sleeves 1 to a perforated plate 1 along circular joints 8. In this case, a vacuum enclosure 11, which is limited by a wall 12 fitted with a lifting eye 13 and retained, for example, by tie-bolts 14 which are hooked onto pins 24 secured to the wall 12 and which are fastened by means of discs 25 and nuts 26 to sleeves 1a located in adjacent relation to the sleeve 1 to be welded, is applied against the perforated plate 2 by means of an inflatable water-seal 15.

Figure 6:
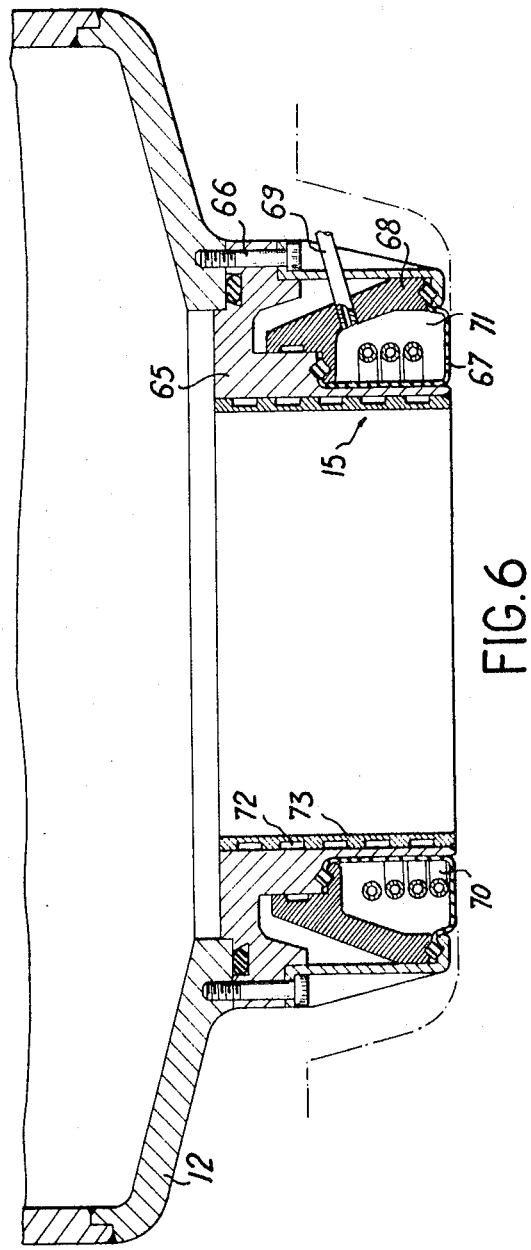
FIG. 6 is a longitudinal sectional view on a larger scale showing the inflatable seal which is interposed between the vacuum enclosure and the parts to be welded.

The seal just referred-to, which is illustrated in detail in FIG. 6, comprises a U-shaped annular housing 65 which is attached, for example, by means of screws 66 to the wall 12 of the enclosure 11. Above the part to be welded, said housing 65 is sealed off by means of an L-shaped flexible annular membrane 67, one of the arms of which is in contact with the housing 65 whilst the other arm is intended to bear on the part to be welded. This membrane 67 is maintained between the housing 65 and a ring 68 which is fixed inside this latter and provided with nozzles such as the nozzle 69 for the admission and discharge of a fluid which serves to inflate the seal, plain water being preferably employed for this purpose.

The ring 68 is also adapted to carry nozzles for the supply of a cooling system 70 disposed inside the chamber 71 which is delimited by the membrane 67 and the ring 68. A second cooling system is formed on the wall of the housing 65 by means of channels 72 forming ducts, said channels being cut in a ring forming a tightly-fitting outer casing of the wall of said housing 65 which supports the membrane 67. This second cooling system 72 is thus located inside the enclosure 1 and forms a thermal barrier in front of the membrane 67.

In any case, said membrane is maintained at a relatively low temperature by the cooling system 70. Said membrane can therefore readily retain its properties of flexibility and be inflated and deflated a large number of times without any resulting reduction in efficiency. This membrane is preferably fabricated of neoprene or any like material which, under the action of pressure developed within the chamber 71, is capable of closely conforming to any excrescences which may exist on the parts to be welded, thereby ensuring perfect leak-tightness between said parts and the enclosure.

A vacuum may then be created within the enclosure 11.

In addition, the wall 12 is extended by a pumping system which is secured to a flange 16 and is provided with an inspection window 17.

Inside the enclosure 11, which has a substantially cylindrical shape in the embodiment which is illustrated, an electron gun 6 is mounted directly at the end of a support arm 5 which passes through the sleeve 1 to be welded and along its entire length. Said arm is centered at each end of said sleeve by means of two stationarily fixed centering rings 3 and by means of ball-bearings 4 which permit the rotational motion of said arm within said sleeve. Said rotational motion is accompanied by a circular motion of the electron gun which is perfectly concentric with the internal circle of the sleeve 1.

A motor 7 which is supported by the arm 5 within the enclosure or chamber 11 makes it possible to regulate in vacuo the radius of the aforesaid circular motion with a view to ensuring that the axis of the electron beam is in exact coincidence with the axis of the joint 8 to be welded.

At the other end of the sleeve 1, the arm 5 is driven in rotation by a motor 9 and coupled to this latter, for example, by means of a system of pinions 10, said motor being detachably secured to the ring 3 by which it is centered in the sleeve 1.

High voltage is supplied to the electron gun 6 by means of two conductors 20 which are embedded in insulating material over the entire length of the support 5 and thus screened without any break in continuity. A special plug connector 21 provides a connection with the usual high-voltage supply cable.

A static seal 18 which can be inflated with air and associated with two dynamic lipped seals 19 serve to close off the vacuum enclosure 1 between the rotating arm 5 and the sleeve 1.

When said enclosure 11 is thus placed in position in leak-tight manner by virtue of the seals 15, 18 and 19, a vacuum can be established by means of the pumping system which is mounted at 16, whereupon the position of the electron gun 5 is adjusted by initiating the operation of the motor 7. The arm 5 is then driven in rotation and the electron beam emitted by the electron gun 6 welds the sleeve 1 to the perforated plate 2. Strict precision of the welding operation is obtained by virtue of the centering of the arm 5 within the sleeve 1 itself whilst absolute leak-tightness of the enclosure is ensured by the assembly of inflatable seals 15 and 18 and lipped seals 19, even if the plate on which the enclosure 11 rests does not have a wholly uniform surface. Furthermore, the wall 12 is not traversed by any element which would be liable to impair leak-tightness during the displacements of the electron gun. The vacuum which is produced within the enclosure 11 can thus be of a very high order, thereby facilitating the welding operation.

Figure 2:
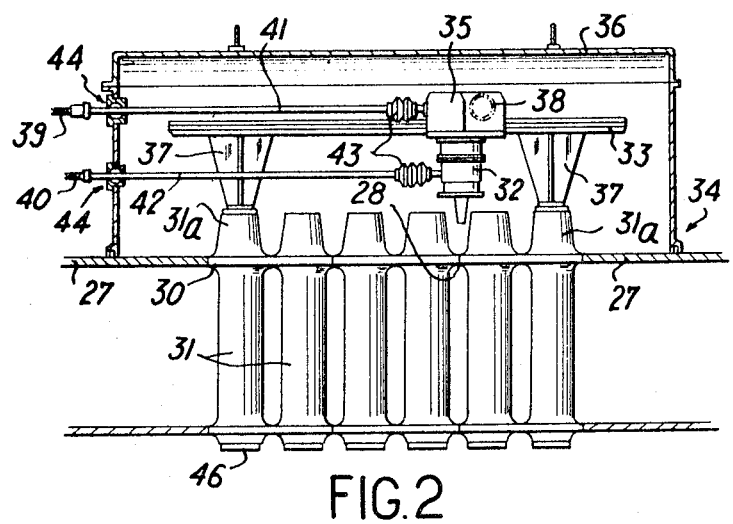
FIG. 2 is a longitudinal sectional view of the device according to a second form of construction in the case in which the parts to be welded are thimbles which are intended to be assembled in a square lattice arrangement.
Figure 3:
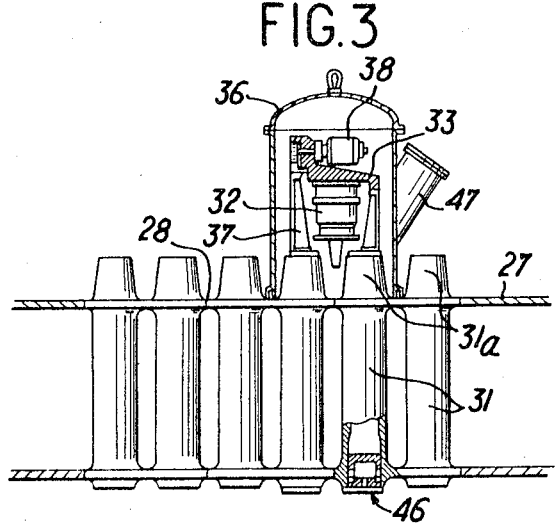
FIG. 3 is a transverse sectional view of the device referred to above.

FIGS. 2 and 3 represent in cross-section another form of construction in which the parts to be welded are thimbles 31 provided with flat spacer members 30 which are intended to be welded both to each other along two perpendicular lines 28 and to end-plates 27.

A vacuum enclosure 36 of substantially parallepipedal shape is placed in leak-tight manner around the thimbles 31 or at least around part of these latter and over the sheet-members or plates 27 with interposition of seals 34 which are similar to the seal 15 of FIG. 6.

Within the interior of said enclosure 36, an electron gun 32 is carried by a trolley 35 which is movable in two directions at right angles to each other on a fixed support 33 which is supported by four stools 37 on the four heads 31a of the end thimbles 31. The displacement of the carriage 35 is effected by a motor 38 which is also carried by the support 33. Current is supplied to said motor in the same manner as the electron gun 32 itself via cables 39, 40 which are placed within tubes 41, 42. Said tubes are connected by means of bellows elements 43 to said electron gun and to said motor and carried by self-aligning bearings 44 at the point at which they pass through the wall of the enclosure 36. Outside said enclosure, the cables 39, 40 are connected to a supply circuit (which has not been shown in the drawings). However, said cables are of sufficient length to permit the displacements of the electron gun by sliding within the tubes.

Similarly, a cooling fluid can be supplied to the electron gun by means of a pipe slidably fitted in one of the through-tubes.

Sealing of the enclosure 36 is completed by means of a leak-tight plug 46 which is fixed in the end of each thimble 31. In the same manner as the enclosure 11, said enclosure 36 is coupled to a pumping system which is not shown in FIGS. 2 and 3, and is fitted with a viewing window 47.

A high degree of vacuum can thus be obtained within the enclosure 36 and the electron beam which is emitted by the gun 32 progressively as this latter moves along the line of separation of the thimbles results in the execution of effective and high-penetration welding of said thimbles.

Figure 5:
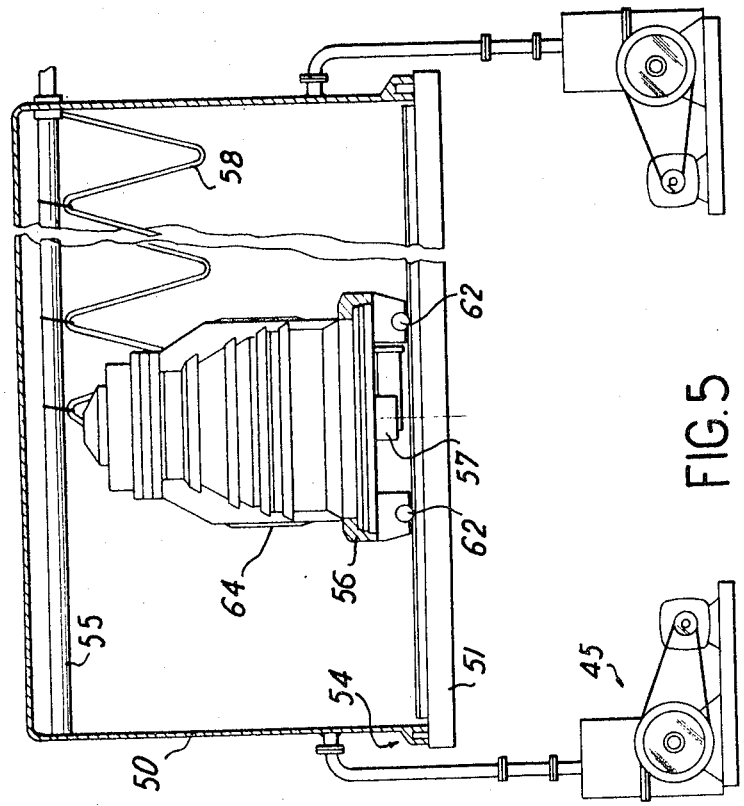
FIG. 5 is a longitudinal sectional view of the device of FIG. 4.
Figure 4:
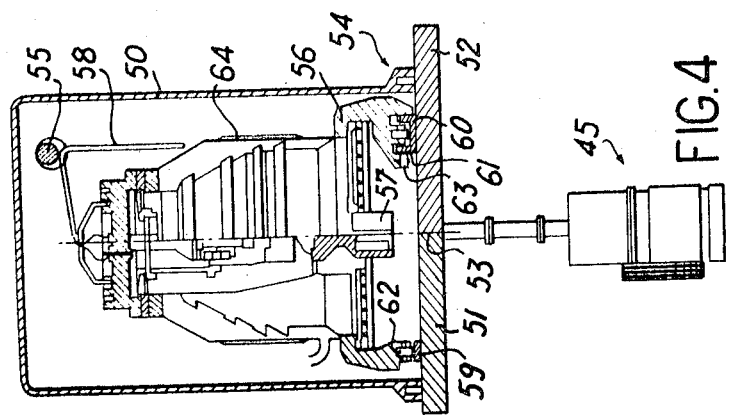
FIG. 4 is a transverse sectional view of the device according to a third form of construction.

However, in some cases in which it proves necessary, for example, to join flat plates, another alternative embodiment of the welding device is preferably employed, and this embodiment is shown in FIGS. 4 and 5. A chamber or enclosure 50 of substantially rectangular cross-sectional configuration is accordingly mounted on the two plates 51 and 52 to be welded on each side of their junction 53, with interposition of an inflatable and cooled seal 54, pumping systems 45 being provided for the purpose of creating a vacuum within said enclosure. A cross-bar 55 is mounted in said enclosure in a direction parallel to the welding seam 53. Said cross-bar is adapted to carry at least one flexible electric cable 58 for supplying an electron gun 57 and motors which effect the displacement of the carriage 56 on which said gun is placed.

Each of the parts 51 and 52 to be welded carries a rail parallel to the welding seam 53, said rail being constituted on the part 51 by a plate 59 which is welded, for example, by spot welding and, on the part 52, by a U-section bar 60 which is welded in the same manner and having a thickness at the center which is the same as that of the plate 59, the face 61 of the bar 60 which is parallel to the faces to be welded of the parts 51 and 52 having been machined at the same time as these latter. The trolley 56 of the electron gun 57 bears on one side on the plate 59 by means of a runner-wheel 62 and, on the other side, is guided in its displacement by the reference face 61 of the bar 60 which forms a rail, whilst a runner-wheel 63 which is applied against said face 61 provides guiding action.

The electron gun can thus move along the welding seam 53 without deviating from this latter, and the electron beam always remains directed exactly along said seam. In some cases, the electron gun can be surrounded by a casing 64 connected to a pumping system (not shown in the drawings) which makes it possible to operate the electron gun under a very high vacuum whilst the chamber 50 is simply maintained under a force-vacuum.

Whatever mode of construction may be adopted, the vacuum enclosure can be effectively applied to the parts to be welded and the electron gun performs a movement of displacement while also being supported on said parts without any attendant danger of impairing the leak-tightness of the structure.

The welding device according to the invention is also of very small overall size and can therefore be readily transported for use in the field; it can also be utilized for the assembly of parts of the most varied nature.

As will be understood, this invention is not limited in any sense to the forms of construction which have been described and illustrated and which have been given solely by way of example.

What we claim is:

1. A device for welding two massive parts by electron bombardment comprising a vacuum enclosure of relatively small volume mounted on one of the parts to be welded, an opening in said enclosure around the weld line of the joint to be formed, an annular open housing connected to said enclosure around said opening and opening toward said weld line, a rigid ring mounted in said housing, a flexible membrance fixed between said housing and said ring and forming a pressure chamber closing said housing, said membrane engaging said one of said parts, means for exerting pressure in said pressure chamber to form a vacuum seal between said enclosure and said one of said parts, a cooling system in said pressure chamber for cooling said membrane, an electron gun movable in said enclosure and supported by the other of said parts and means for adjusting the position of said gun in said enclosure.

2. A device in accordance with claim 1 including a second cooling system mounted between said flexible membrane and the interior of said enclosure.

3. A device in accordance with claim 1 for welding in a circle, said enclosure being cylindrical and secured in leak-tight manner around a pipe section to be welded to a plate, said electron gun being carried by a supply arm centered in said pipe section, sealing members between said arm and said pipe section, and means for rotating said gun inside said enclosure about the axis of said arm and of said pipe section from that extremity of said arm which is remote from said enclosure.

References Cited

UNITED STATES PATENTS

| 3,084,243 | 4/1963 | Gotch | 219—125 |
| 3,136,883 | 6/1964 | Radtke | 219—121 |
| 3,219,792 | 11/1965 | Pederson | 219—121 |
| 3,301,993 | 1/1967 | Boyd et al. | 219—121 |
| 3,350,537 | 10/1967 | Lawrence et al. | 219—125 |
| 3,395,263 | 7/1968 | Kazlauskas | 219—125 |

JOSEPH V. TRUHE, Primary Examiner

W. DEXTER BROOKS, Assistant Examiner

U.S. Cl. X.R.

219—60